2,784,164

LEADS OR CRAYONS AND METHOD OF MAKING THE SAME

Gordon V. Ahlman, Brooklyn, N. Y., and Wilbur R. Wyckoff, Hasbrouck Heights, N. J., assignors to Joseph Dixon Crucible Company, Jersey City, N. J., a corporation of New Jersey No Drawing. Application September 27, 1951, Serial No. 248,645

10 Claims. (Cl. 260—15)

This invention relates to a lead or crayon rod which may be made in any desired length, shape or size, and as a pencil core or crayon rod and may have any desired color, including black and white. More particularly stated, the invention relates to leads or crayon rods of the non-calcined type.

It is well known that writing or marking materials of the non-calcined type are usually affected by changes in the relative humidity of the ambient atmosphere. An increase in the relative humidity causes an increase in diameter and an increase in flexibility, but a decrease in transverse strength and a softening of the mark made by the lead or crayon.

On the other hand, a decrease in the relative humidity of the surrounding atmosphere causes a decrease in diameter, a decrease in flexibility, an increase in transverse strength, and a hardening of the mark made by the lead or crayon. Changes in dimensions or diameter are particularly objectionable in small diameter mechanical pencil leads since an increase in diameter causes the leads to bind in the tip and a decrease may prevent a proper gripping of the lead in the pencil chuck.

This invention has for its salient object to overcome these difficulties and to provide a lead or crayon rod of the non-calcined type so constructed that it will not be deleteriously affected by variations in the relative humidity of the ambient atmosphere.

Another object of the invention is to provide a marking material that will have superior marking qualities under all atmospheric conditions.

Another object of the invention is to provide a lead or crayon of the non-calcined type so constructed and so treated that it will not absorb moisture.

Another object of the invention is to provide a method of rendering a water imbibing binder in a lead or crayon of marking material, insoluble in water.

Further objects will appear more fully from the following specification.

The ingredients of filler, color, waxy material and water imbibing agglutinant or binder may be conventional.

For instance, the filler may be talc, clay, pyrophyllite, etc. Any water or oil soluble dye or any pigment may be used.

The waxy material may be calcium stearate or any water insoluble metal soap which will withstand the heat of the heat treatment hereinafter explained.

Although methyl cellulose is recommended as the agglutinant or binder, the invention is not limited to this specific material, but the binder should be a water imbibing or hydrophilic material which will be rendered substantially unaffected by water or moisture by the addition of a melamine type resin or resin having like characteristics and a heat treatment hereinafter described. Other cellulose derivatives, particularly the lower alkyl ethers, that is, ethers of cellulose and lower molecular weight aliphatic acohols, may be used as the agglutinant or binder.

A thermosetting melamine resin is preferably added, but any material may be used which, when added to a mixture constituted as above described, renders the binder substantially insoluble after heat treatment. Materials in addition to melamine resin that have this property are thermosetting resins, such as urea formaldehyde resins and resorcinol formaldehyde resins.

As an example of suitable ingredients for a lead or crayon having the desired characteristics, the following ingredients in the approximate proportions stated may be used.

| | Percent |
|---|---|
| Talc or other filler | 10–70 |
| Color pigment or dyestuff | 5–40 |
| Calcium stearate (waxy material) | 5–40 |
| Methyl cellulose (agglutinant or binder) | 2–15 |
| Melamine-formaldehyde resin | 1–8 |

The method of forming the leads or crayons is as follows: the agglutinant is wetted with sufficient water to form a paste and the wetted binder and other ingredients are given intensive mixing to form a homogeneous dispersed mixture.

It may be desirable to add a wetting agent for the purpose of lowering the surface tension to permit more intimate blending of the ingredients.

The mixture may then be passed through a three roll mill for additional dispersion.

The mixer is then preferably forced through a multiple hole die, forming strands, and the strands are then compressed into a compact mass. Then the mixture or mass is extruded to form leads or rods. The rods or leads are then oven dried at a temperature of approximately 170° F. to drive out all moisture therefrom.

Thereafter, the dry rods or leads are heated to approximately 250°–350° F. for about a three minute minimum, which treatment renders the composition and binder water insoluble. Reference to percent means parts per hundred, that is, percentage by weight.

Although one specific embodiment of the invention has been particularly described, no limitations are intended aside from those imposed by the appended claims.

What we claim is:

1. A method of making non-calcined water insoluble crayon and pencil leads unaffected by moisture, which comprises forming a paste of water and a water-absorbent lower alkyl ether of cellulose to provide a binder, mixing from about 2 to 15% of said cellulose ether binder with filler, coloring material, and a water insoluble metal soap capable of withstanding the temperatures of subsequent heat treatment, as the predominant constituents, and from about 1 to 8% of a thermosetting resin selected from the group consisting of melamine-formaldehyde, urea-formaldehyde and resorcinol-formaldehyde resins, forming the mixture into shaped leads, heating the shapes to remove moisture, and thereafter further heating the shapes to from about 250 to 350° F. to cure the resin and render the shapes water-insoluble and non-absorbent.

2. A method according to claim 1 in which the thermosetting resin is a melamine-formaldehyde resin.

3. A method according to claim 1 in which the alkyl cellulose ether binder is methyl cellulose.

4. A method of making non-calcined crayon and pencil leads comprising mixing 10–70% filler, 5–40% coloring material, 5–40% water insoluble metal soap, 2 to 15% of a water absorbent lower alkyl ether of cellulose as an agglutinant, and 1 to 8% of a thermosetting resin selected from the group consisting of melamine-formaldehyde, urea-formaldehyde and resorcinol-formaldehyde, forming the mixture into shaped leads, and heating the shapes to cure the resin and render the leads water insoluble and non-absorbent.

5. A method according to claim 4 in which the water insoluble soap is calcium stearate, and the agglutinant is methyl cellulose.

6. A non-calcined crayon or pencil lead comprising a heat treated shaped composition consisting essentially of a filler, coloring material, and a water insoluble metal soap in predominant amount, from about 2 to 15% of a water absorbent lower alkyl ether of cellulose as a binder, and from about 1 to 8% of a heat cured thermosetting resin selected from the group consisting of melamine-formaldehyde, urea-formaldehyde, and resorcinol-formaldehyde resins imparting non-absorbent and water insoluble properties to said binder and composition.

7. An article according to claim 6 in which the alkyl cellulose ether binder is methyl cellulose.

8. An article according to claim 7 in which the water insoluble metal soap is calcium stearate.

9. An article according to claim 8 in which the resin is a melamine-formaldehyde resin.

10. A non-calcined crayon or pencil lead comprising a heat cured shaped composition which is non-absorbent to moisture and water insoluble consisting essentially of the following ingredients in the stated proportions, filler 10–70%, coloring material 5–40%, calcium stearate 5–40%, methyl cellulose 2–15%, and melamine-formaldehyde resin 1–8%.

References Cited in the file of this patent

UNITED STATES PATENTS

| | | |
|---|---|---|
| 735,604 | Smith | Aug. 4, 1903 |
| 2,013,584 | Schwanhausser | Sept. 3, 1935 |
| 2,280,988 | Weiser | Apr. 28, 1942 |
| 2,380,126 | Sturm | July 10, 1945 |
| 2,381,878 | Cassell | Aug. 14, 1945 |
| 2,432,971 | Ruthman et al. | Dec. 16, 1947 |
| 2,453,608 | West | Nov. 9, 1948 |
| 2,474,292 | Weldner | June 28, 1949 |
| 2,515,170 | Cassell | July 18, 1950 |
| 2,566,754 | Van Dusen | Sept. 4, 1951 |

FOREIGN PATENTS

| | | |
|---|---|---|
| 325,014 | Great Britain | Feb. 10, 1930 |